Nov. 19, 1957 D. RASKY 2,813,800
METHOD OF PACKAGING AND FREEZING SHELLED EGGS
Filed Oct. 14, 1954 4 Sheets-Sheet 1
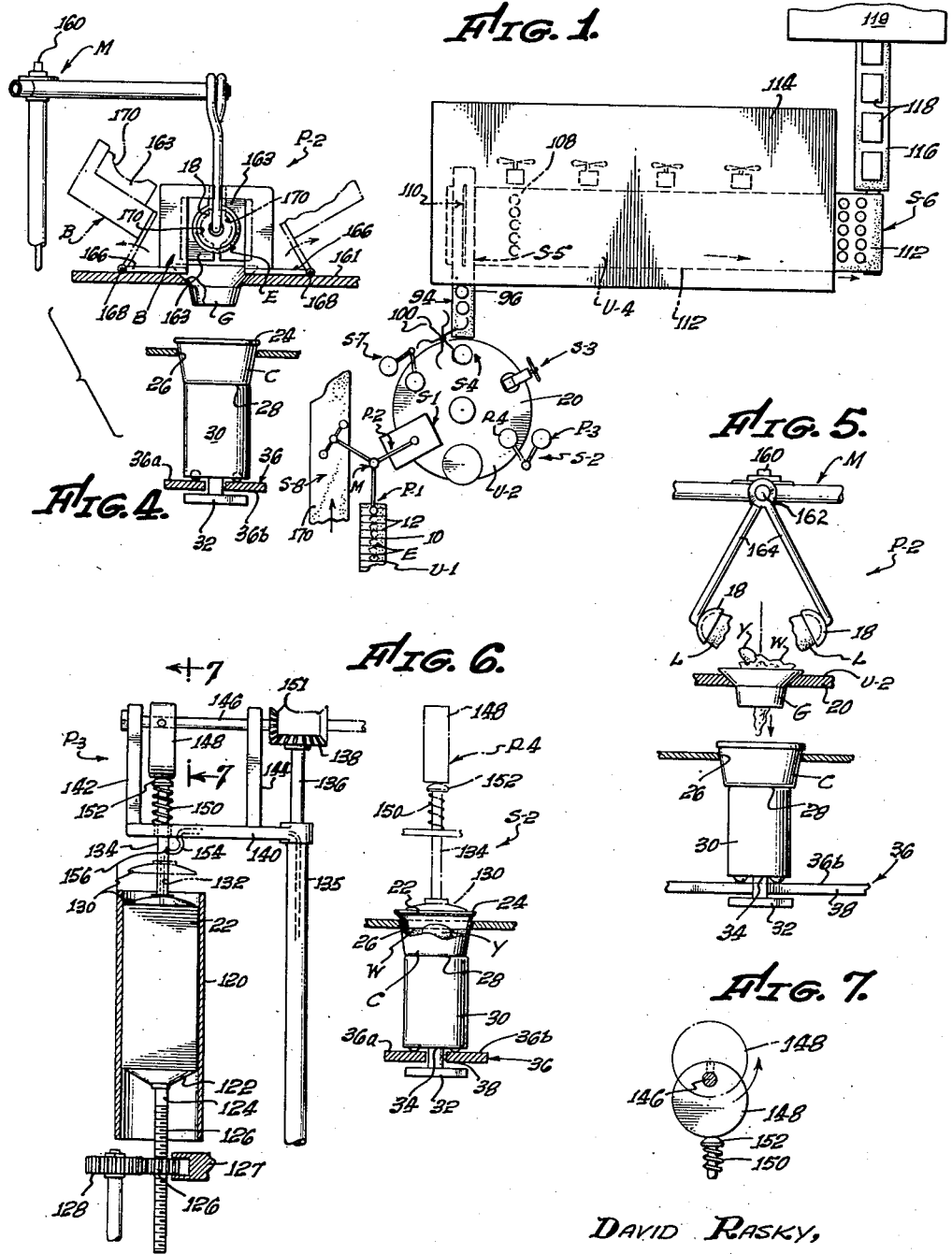
DAVID RASKY,
INVENTOR.
BY William C. Babcock
ATTORNEY.

Nov. 19, 1957 D. RASKY 2,813,800
METHOD OF PACKAGING AND FREEZING SHELLED EGGS
Filed Oct. 14, 1954 4 Sheets-Sheet 2
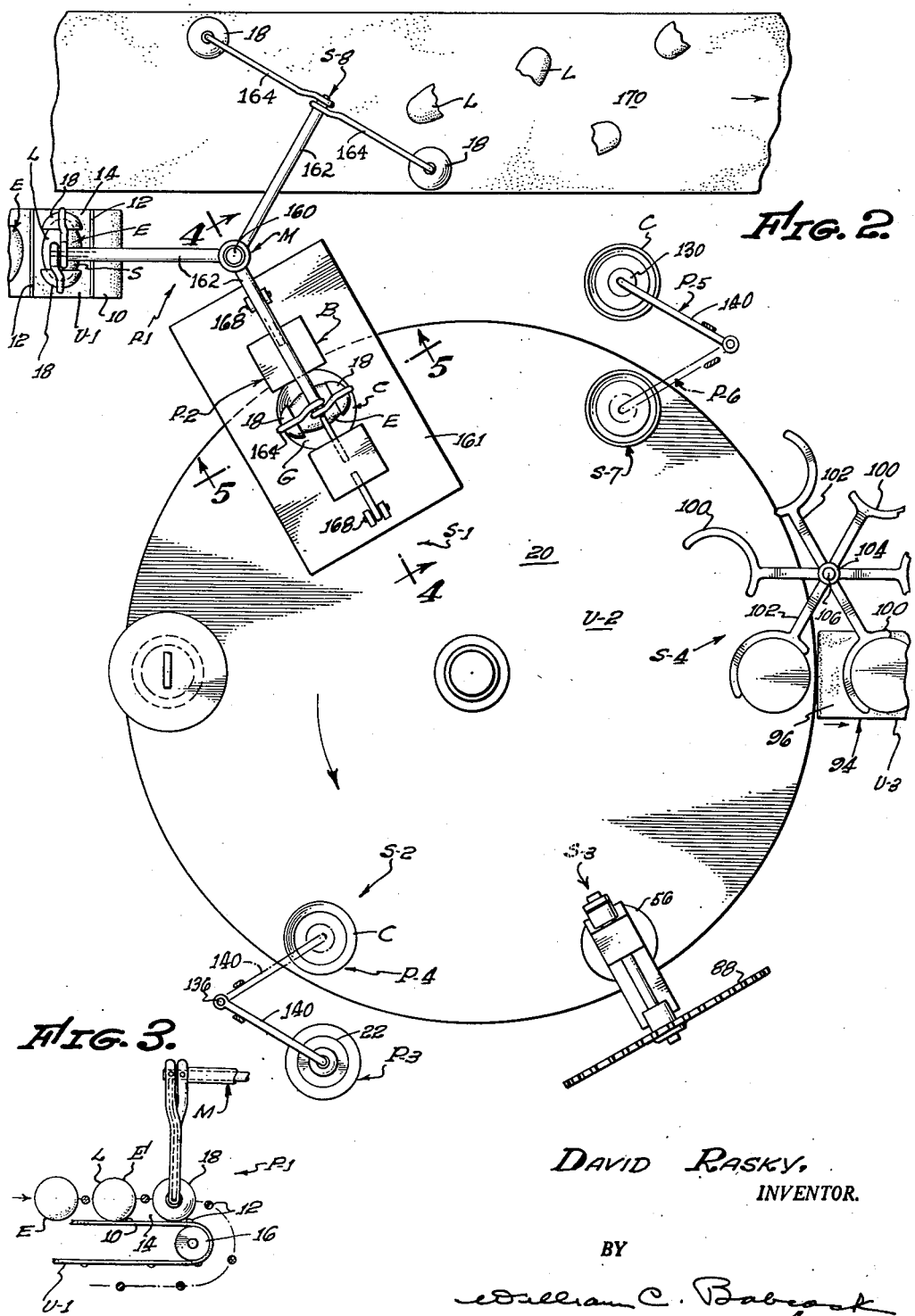
DAVID RASKY,
INVENTOR.
BY William C. Babcock
ATTORNEY.

Nov. 19, 1957             D. RASKY             2,813,800
METHOD OF PACKAGING AND FREEZING SHELLED EGGS
Filed Oct. 14, 1954             4 Sheets-Sheet 3
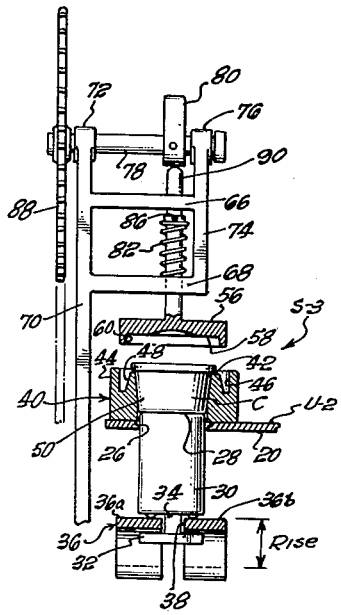
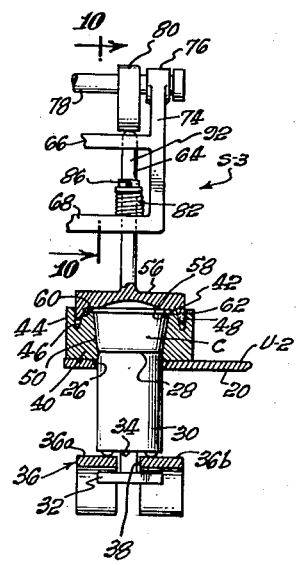
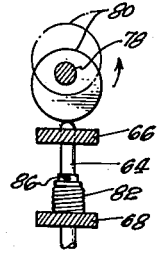
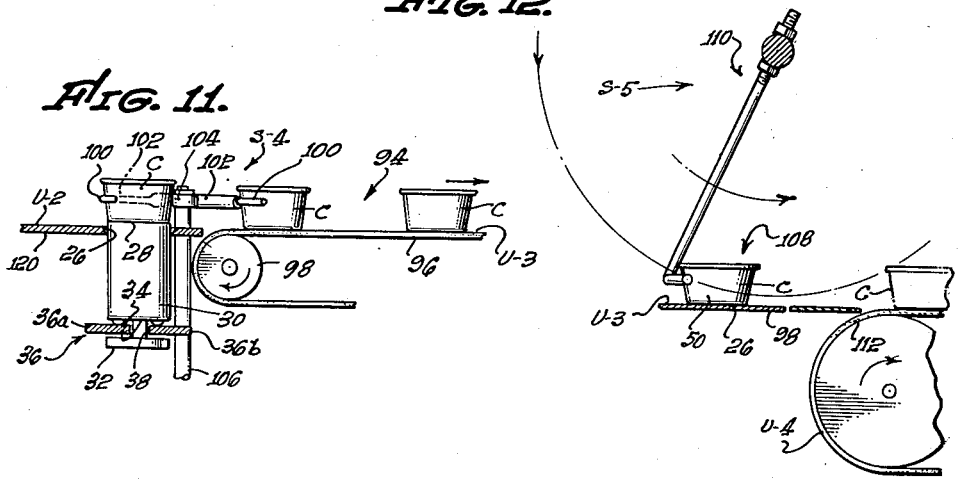
DAVID RASKY,
INVENTOR.
BY
William C. Babcock
ATTORNEY.

Nov. 19, 1957 D. RASKY 2,813,800
METHOD OF PACKAGING AND FREEZING SHELLED EGGS
Filed Oct. 14, 1954 4 Sheets-Sheet 4
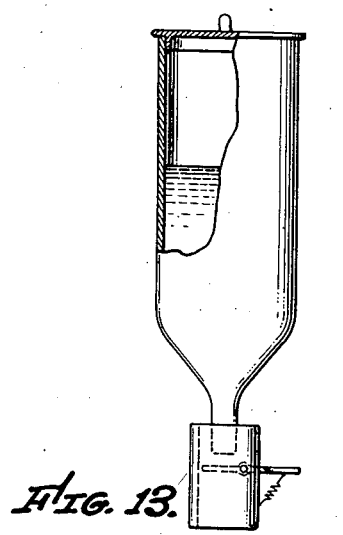
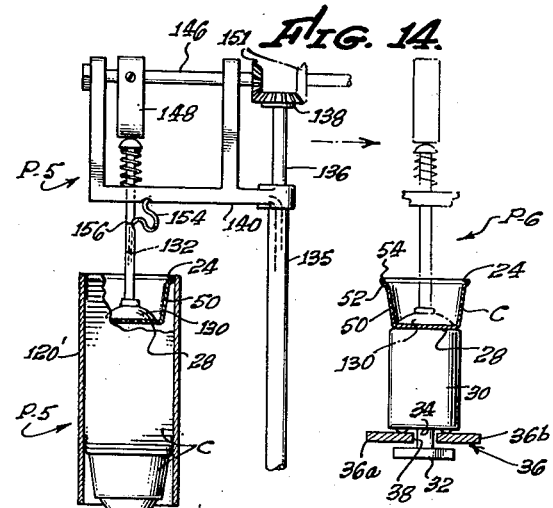
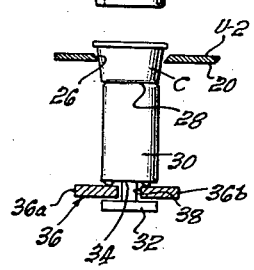
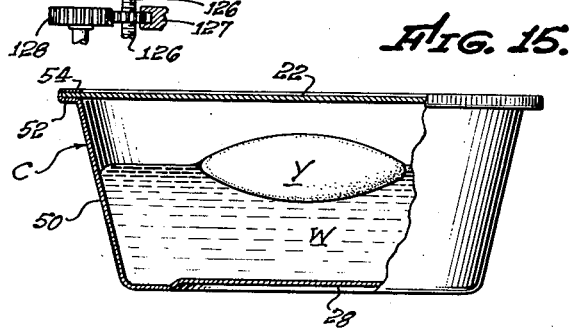
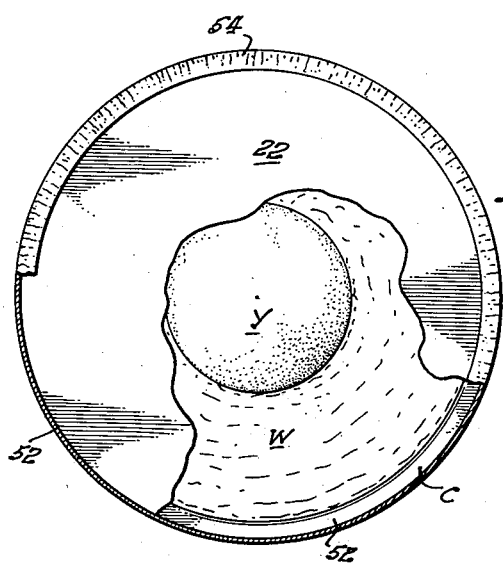
DAVID RASKY,
INVENTOR.
BY
William C. Babcock
ATTORNEY.

2,813,800
METHOD OF PACKAGING AND FREEZING SHELLED EGGS

David Rasky, North Hollywood, Calif.
Application October 14, 1954, Serial No. 462,187
14 Claims. (Cl. 99—196)

The present invention relates generally to the food industry, and more particularly to a method of continuously supplying freshly frozen eggs in sealed individual containers, an apparatus therefor, an individual egg container, and an egg packaged in said container by said method.

Freezing eggs is by no means a new concept in the food industry, and it has been common commercial practice for some time to package same, either whole or the egg whites or egg yolks separately, in thirty-pound tins for delivery to large consumers such as hotels, bakeries, restaurant chains, institutions, and the like. However, the market demand for such a large quantity of frozen eggs at one time is limited, for the smaller commercial consumer or the normal householder cannot handle such volume. Due to the limited demand for frozen eggs in such large quantities, the price of eggs continues to vary widely, and it tends to drop when chickens are producing in abundance, and rise when this production is low.

A major object of the present invention is to provide a greatly increased year-round stable market for frozen eggs which will tend to minimize the wide variations in the retail market price that have heretofore prevailed by freezing the eggs during the flush production period and building up a surplus stock from which the market demand may be supplied during the low period of egg production.

Another object in devising the present invention is to make frozen eggs available to both the large consumer as well as the small, particularly housewives, who to date have been unable to purchase frozen eggs in quantities sufficiently small to meet their needs and storage space available therefor.

A further object of the invention is to supply packaged fresh eggs that may be stored in a compact form to lessen the cost of refrigerated storage thereof between the date at which the egg is frozen and packaged and when it is withdrawn from the refrigerated storage space for distribution to the normal and customary retail outlets.

Another object of the invention is to provide freshly frozen eggs that are individually packaged in such a manner as to occupy a minimum of space in the purchaser's refrigerator, and adapted for easy consumption without prior experience, in the same manner as fresh eggs, with the frozen egg containers being sufficiently low in cost to allow for discard thereof after the egg contents are used.

Still another object of the invention is to provide individual frozen eggs in hermetically sealed containers, which eggs are inspected and graded prior to packaging thereof, whereby the purchaser is assured of the uniform quality and grade of eggs purchased.

A still further object of the invention is to provide a simple, economical means of freezing eggs that may be conveniently located in any large egg producing area whereby transportation costs of fresh eggs to the freezing and storage plant therefor are minimized, as well as effecting a considerable reduction in egg handling costs after they are frozen, in contrast to the problems encountered in marketing fresh, bulky shell eggs received directly from the ranch or farm source.

Yet another object of the invention is to supply package means for frozen eggs in which they may be retailed bearing the identity of the ranch or farm source thereof, rather than remaining unavoidably anonymous as in the past.

Still a further object of the present invention is to provide separately packaged frozen eggs which may be purchased in quantity at low cost by such consumers as the Armed Forces, airlines, shipping lines, and the like, where there is a constant demand for fresh eggs, but which heretofore have been unavailable due to lack of refrigerated storage space therefor over relatively long periods of time.

A further object of the invention is to supply a method of freezing individually packaged eggs and apparatus therefor, by means of which a constant supply of frozen eggs may be made available at reasonable prices to both wholesale and retail markets alike.

Another object of the invention is to supply a method of packaging and freezing an individual egg in a suitable container and in large quantities which is largely automatic, which eggs are candled, and closely inspected before being packaged under the most sanitary conditions, whereby the ultimate consumer is assured of the particular graded quality egg desired.

Yet a further object of the invention is to provide a steady supply of freshly frozen eggs that may be maintained under proper refrigeration for periods of one year's duration or less without any material change in the physical characteristics thereof.

These and other objects and advantages of the present invention, and certain modifications thereof, will become apparent from the following description of a preferred method of freezing individually packaged eggs, apparatus therefor, and a frozen egg container, as shown in the attached drawings:

Figure 1 is a plan view of the apparatus of the present invention

Figure 2 is a plan view of a portion of the apparatus which continuously delivers sealed, egg-filled containers to a refrigerated area;

Figure 3 is a fragmentary side elevational view of one of the fresh egg-engaging arms of the apparatus;

Figure 4 is a fragmentary vertical cross-sectional view of the apparatus showing the shell breaking portion thereof, taken on line 4—4 of Figure 2;

Figure 5 is a side elevational view of the egg shell breaking portion of the invention, taken on line 5—5 of Figure 2;

Figure 6 is a fragmentary side elevational view of that portion of the apparatus in which a container cover is removably engaged and positioned on the container in which the egg is disposed;

Figure 7 is a fragmentary vertical cross-sectional view of a portion of the apparatus shown in Figure 6, taken on line 7—7 thereof;

Figure 8 is a combined vertical cross-sectional and side elevational view of that portion of the apparatus which forcibly seals the cover and container together;

Figure 9 is another combined vertical cross-sectional and side elevational view of the apparatus shown in Figure 8, after the cover has been affixed to the containers;

Figure 10 is a fragmentary vertical cross-sectional view of a portion of that apparatus shown in Figure 9, taken on line 10—10 thereof;

Figure 11 is a fragmentary side elevational view of that portion of the apparatus in which the sealed containers are directed onto a conveyor for transfer to a freezing area;

Figure 12 is a side elevational view of a rotating member by which packaged eggs are moved onto the conveyor in transverse rows;

Figure 13 is an alternate form of the invention in which supplementary egg white may be added to a container if desired;

Figure 14 is a side elevational view of a portion of the apparatus by which containers are individually removed from a vertical stack thereof and disposed on a table for transfer to positions to receive the whole egg after the shell is broken;

Figure 15 is a combined, vertical cross-sectional and side elevational view of one of the sealed containers in which an egg is disposed; and, Figure 16 is a plan view of the container shown in Figure 15 with a portion of the cover broken away to show the contents thereof.

Referring now to the drawings for the general arrangement of my invention, it will be seen that the method includes supplying a plurality of fresh, candled eggs E having shells L in sequence at a first position P–1 by means of an elongate first moving surface U–1. The surface U–1 is preferably defined by an endless belt conveyor 10 that is provided with a number of transversely disposed spacer bars 12 that define individual egg holding spaces 14 therebetween. Conveyor belt 10 is rotatably supported on each end by suitable rollers 16, the forwardly disposed one shown in Figure 3 preferably being the driving roller.

Each of the eggs E upon reaching first position P–1 is engaged by two laterally movable resilient half cup-shaped members 18 that are actuated by the mechanism M shown in Figures 1, 2, and 5 to raise same, and move the egg to an elevated second position P–2.

The shell L of each egg E when disposed in position P–2 is broken in substantially the center thereof by suitable means B as may be seen in Figure 4, with the white W and yolk Y dropping downwardly as a unit through a guide funnel G to a cylindrically shaped container C. Each container C is moved to a first station S–1 by a horizontally disposed circular table 20 that defines a second surface U–2 shown in Figures 1 and 2. The first station S–1 is in vertical alignment with second position P–2.

After a container C has received the white and yolk of an egg E, the table 20 is caused to move through part of a revolution to advance the egg holding container C to a second station S–2, best seen in Figures 1, 2, and 6. During the time an egg holding container is disposed at station S–2, a circular cover 22 that may be sealed to the container C is placed on the upper open portion 24 thereof.

The table 20 has a number of circumferentially spaced annular openings 26 formed therein, as may be seen in Figures 4 to 8. Each of the openings 26 is adapted to receive one of the containers C. The bottom 28 of each container when so disposed in one of said openings 26, rests on a vertically movable support 30 that at all times travels in vertical alignment with the particular opening 26 with which it is associated. Each of the supports 30 has an inverted T-shaped member 32 extending downwardly from the bottom 34 of the support. A track 36 is disposed beneath the table 20, and is formed of two laterally spaced segments 36a, 36b that define a longitudinally extending slot 38 therebetween. The track 36 follows a course that is in vertical alignment with the path of the openings 26 as the table 20 rotates. The bottom 34 of each of the supports 30 is slidably mounted on the upper surface of track 36, with the member 32 movably disposed in slot 38. Thus, the table 20 imparts horizontal movement to containers C, with the elevation of said containers, when disposed in openings 26, being controlled by the positions of supports 30.

In Figures 4, 8, and 9, it will be seen that the elevation of the track 36 varies, with the elevation of the containers c disposed in openings 26 varying in accordance therewith. As container C moves from station S–2 to station S–3 the track 36 rises, and as a result a container C at station S–3 is disposed on one of the supports 30 above the surface of the table 20.

After it moves one of the containers C to station S–3, the table 20 stops. Container C is then disposed in a mandrel 40, which mandrel slidably rests in a fixed position on the upper surface of the table 20. Mandrel 40, when in the closed position, defines an annular flat face 42 from which a downwardly and outwardly tapering side wall 44 of an annular slot 46 extends. The inner circumferential edge of face 42 develops into a downwardly and inwardly tapering annular face 48 that is complimentary to the exterior surface of the side wall 50 of the container C, as shown in Figure 15. Container C is formed with a horizontal annular lip 52 on the upper portion thereof, from which a short vertical tab 54 extends upwardly (Figure 15).

When the mandrel 40 first encircles container C as shown in Figure 8, the lip 52 is disposed on face 42, and the sidewall 50 of the container is in contact with the face 48 of the mandrel. A vertically movable die 56 is provided that is preferably of annular shape. The die includes a flat horizontal first annular surface 58, from the outer circumferential edge of which an annular downwardly and outwardly tapering second surface 60 extends. The second surface 60 defines a part of an annular flange 62 which is of such transverse cross-section, that the flange may fit snugly in slot 46.

When the die 56 is moved downwardly as shown in Figure 9, the tab 54 of the container is engaged and bent inwardly by the second surface 60 of the die. Final sealing of the cover 22 to the container C is effected when the second surface 60 of the die contacts the horizontally disposed face of tab 54 as shown in Figure 9. The cover 22 on container C is now crimped between the upper face of lip 52 and the lower face of tab 54.

Die 56 is preferably mounted on the lower end of a vertically disposed rod 64 that is slidably mounted in aligned bores formed in two horizontal vertically spaced members 66 and 68. Said members 66, 68 are connected by a first upright 70 that has a bearing 72 mounted on the upper end portion thereof, as shown in Figures 8 and 9. A second upright 74 is laterally spaced from first upright 70, and is connected to members 66 and 68. The second upright 74 has a bearing 76 mounted on the upper portion thereof, which bearing 76 is in alignment with bearing 72. The bearings 72 and 76 rotatably support a horizontally disposed shaft 78 that has a cam 80 mounted thereon, which cam is in the same vertical plane as rod 64.

A compressed helical spring 82 encircles a portion of rod 64, with the lower end of the spring pressing against the upper surface of member 66, and the upper end of the spring contacting a transversely disposed pin 86 mounted on rod 64. The rod 64 is, at all times therefore, urged into contact with cam 80. When shaft 78 is rotated approximately 180° by a sprocket 88 mounted thereon, or other suitable means, the die 56 may be moved between a first position 90 which it occupies in Figure 8, and a second position 92 which the die may assume as shown in Figure 9.

After the cover 22 is sealed onto the container C at station S–3, the rod 64 is actuated, separating the halves of mandrel 40 to a greater distance than the widest portion of the sealed containers C, and the table 20 is caused to rotate sufficiently to advance the sealed container to a station S–4, as shown in Figure 2. When a sealed container C is disposed at station S–4, it is in alignment with an outwardly extending conveyor 94. Said conveyor preferably is in the form of an endless belt 96 that is rotatably supported on two or more rollers 98, one of which is shown in Figure 11. The end portion of belt 96 supported by rollers 98 is adjacent to, but not in contact with, the peripheral edge of table 20.

As it moves into station S–4, or if it is desired after it has stopped at this station, the container C is contacted by one of a number of semi-circular fingers 100. The fingers 100 are mounted on the end portions of a number of arms 102, which arms extend outwardly in radially disposed positions from a hub 104. Said hub 104 is rigidly affixed to the upper end portion of a vertically disposed shaft 106, which is located adjacent to the outer peripheral edge of the table 20. Shaft 106 may be rotated in a counterclockwise direction, either continuously or intermittently, by means not shown, as illustrated in Figure 2. After contact is made by one of the fingers 100, the sealed container C is slid off the surfaces of the support 30 and table 20 onto the upper portion of conveyor belt 96, which belt is moving away from the table.

After the sealed containers C are deposited on the conveyor 94, which may be considered broadly as the third moving surface, they are carried thereon to a station S–5, and as they move into said station S–5, are assembled in the form of a row 108 containing a predetermined number thereof, which row is parallel to the movement of the conveyor. The row 108 is preferably defined by the use of a V-shaped rigid member 110 that is disposed above the portion of the conveyor belt on which the containers C are moved. Member 110 has the open end thereof so disposed that the conveyor belt 94 moves the containers into the confines thereof.

In Figure 1 it will be seen that a fourth moving surface is provided in the form of an endless conveyor belt 112 that has the upper portion thereof pass under the upper portion of conveyor belt 94, and normal thereto. Conveyor belt 112 so rotates, by power means (not shown), that the upper portion of said conveyor which is adjacent to but not in contact with the upper portion of conveyor 94, moves outwardly therefrom. After the predetermined number of containers C are within the confines of member 110, said member moves transversely relative to conveyor 94 to slide the row 108 of containers onto the conveyor belt 112. Upon completion of the transfer of a row 108 of containers to the conveyor belt 112, the member 110 is moved to an elevated position to permit the row to be moved away from the conveyor 94.

Conveyor belt 112 as it extends away from conveyor 94 passes through a confined refrigerated space 114 as may best be seen in Figure 1. The refrigerated temperature and the rate of movement of conveyor belt 112 are so regulated, that the eggs in sealed containers C are frozen solid by the time one of the rows 108 has reached a station S–6. The station S–6, as may be seen in Figure 1, is located on the exterior of the refrigerated space 114.

A fifth moving surface, preferably in the form of an endless conveyor belt 116, extends outwardly from station S–6, and substantially normal to the longitudinal axis of conveyor belt 112. As each row 108 of containers reaches the station S–6, the containers in that row are manually packed in rectangular receptacles 118 formed of a suitable sheet material. Each receptacle 118, after it has the proper number of containers C disposed therein, is sealed, and placed on conveyor belt 114 for delivery to a refrigerated storage area 119. The packed receptacles 118 are maintained in this storage area 119 until delivery is made therefrom to a wholesale or retail outlet.

In the commercial operation of the invention, it is highly desirable that mechanical means be provided to place the covers 22 on the containers C at the second station S–2, and that the containers be positioned on table 20 for transfer to the first station S–1 at the same rate as that of the discharge of sealed containers from the table at the fourth station S–4. It is also desirable that the broken egg shells be moved to a predetermined area for disposal.

Covers 22 are mechanically applied to containers C when disposed at the second station S–2 by means of the mechanism illustrated in Figure 6. A stock of covers 22 is provided at a third position P–3 adjacent station S–2, which covers are disposed in a vertical tubular magazine 120 open at the top and bottom. When these covers are stacked in magazine 120 they are supported on an annular plate 122 that is rotatably mounted on the upper end of a vertical shaft 124 in which threads 126 are formed. Threaded shaft 124 rotatably engages a tapped bore formed in an annular toothed member 126, which member is in turn rotatably supported at a fixed elevation by means 127, and when rotated by a meshing gear 128, causes the threaded shaft, plate 122, and cover stack 22 to move upwardly relative to magazine 120. Upward movement of the stacked covers is necessary in order that a cover C is at all times maintained at a predetermined distance from the upper edge of the magazine.

A somewhat flat, annular resilient cover-lifting member 130 is provided that has a lower concave face. This cover-lifting member has a central bore formed therein and is provided with a vertical, rigid tube 134 that is in communication with bore 132. A vertical, rotatable tubular member 135 having a shaft 136 mounted therein is situated adjacent magazine 120, and a ring gear 138 is supported on the upper end thereof. A horizontal arm 140 extends outwardly from tubular member 135, and two laterally separated vertical uprights 142 and 144 are mounted thereon. A horizontal shaft 146 has a cam 148 rigidly affixed thereto, which shaft is rotatably supported by uprights 142 and 144 and on one end of which a pinion 151 is mounted that engages a ring gear 138.

The tube 134 is slidably mounted in a vertical bore formed in arm 140. A compressed helical spring 150 encircles tube 134, with the lower end of the spring resting on the upper surface of arm 140, and the upper end pressing against a solid head 152 rigidly mounted on the upper end of the tube. The head 152, due to the spring 150, is at all times in slidable contact with the cam 148. Flexible tubing 154 is connected to a source of vacuum (not shown) that may be effected at will, with the tubing extending upwardly on tubular member 135, and across arm 140 to an aperture 156 in tube 134.

By rotation of shaft 136, the cam 148 is actuated to move the tube 134 vertically to a position where it contacts the uppermost of the covers 22. Vacuum is then placed on the confined space between the concave face lifting member 130 and uppermost cover 22. The tube 134 is then caused to move upwardly until the holding member 130 and a cover 22 are disposed as shown in phantom line in Figure 6 above the magazine.

The arm 140 is now rotated in a horizontal plane until it is in the position shown on the right in Figure 6 in phantom line. Movement imparted to the cam when the arm is thus disposed, causes the holding member 130 to be moved downwardly to place the cover 22 held thereby on one of the containers. The cover 22 is released when thus disposed by breaking the vacuum to the holding member.

Covers 22 are supplied to the table 20 at a seventh station S–7 by a mechanism as shown in Figure 14 that is identical in structure and operation to the device situated at station S–2 above described. Accordingly, the elements in the mechanism shown in Figure 14 are identified by the same numerals used on the cover placing device, with the exception that a prime is added thereto. A vertical stack of nestled containers C is provided at a fifth position P–5 in a tubular magazine 120'. The location of the fifth position P–5 is best seen in Figure 2.

The mechanism M used in moving an egg E from a first position P–1 to a second position P–2 includes a vertically disposed rotatable shaft 160 that has a number of horizontal radially disposed arms 162 mounted on the upper portion thereof. Each of the arms 162 pivotally supports two downwardly depending rigid members 164 from the ends thereof. Members 164 have the egg engaging members 18 mounted on the lower ends thereof as shown in Figures 1 to 4.

Each pair of members when in first position P–1 may be pivoted outwardly, and then brought together to cause the egg engaging members 18 to hold an egg E therebetween. With an egg E so engaged the shaft 160 is rotated sufficiently to dispose the engaged egg at second position P–2. The engaged egg when at position P–2 is disposed directly above the first station S–1.

A horizontally disposed rigid plate 161 is situated under the egg E when at position P–2, with the plate pivotally supporting two vertical knives 163 on opposite sides of the egg. The knives 163 are preferably mounted on plate 161 by means of two rigid strips 166 to which they are rigidly affixed, and the strips are in turn pivotally connected to the plate by suitable pins 168. A concave shell-engaging edge 170 is formed in each of the knives 163 (Figure 4). When it is desired to break the shell L of an egg, the knives 163 are caused to pivot inwardly from the positions shown in phantom line in Figure 4, to positions sufficiently close together to accomplish this purpose. However, the knives 163 are not brought so close together as to puncture the egg yolk Y, and after the shell is broken, the whole raw egg drops into a container C disposed at the first station S–1.

The engaging members 18 continue to retain the broken shell L until after the shaft 160 has been rotated sufficiently to move to an eighth station S–8, whereupon members 18 release the shell halves to drop onto a sixth moving surface defined by the upper side of an endless roller-supported conveyor belt 170. Belt 170 (Figure 2) transports the broken shells L away from table 20, and deposits same in a confined space (not shown) for final disposal thereof.

The apparatus and method of the present invention have previously been described in detail and need not again be repeated.

Although the apparatus, method and package herein shown and described are fully capable of achieving the objects and providing the advantages hereinbefore mentioned, it is to be understood that they are merely the presently preferred embodiments of the invention and it is not intended to limit same to the details of construction herein outlined other than as defined in the appended claims.

I claim:
1. A method of sequentially packaging individual shelled eggs in sealed containers and freezing same, comprising: advancing a plurality of shell eggs in timed sequence from a first position to a second position elevated thereabove; breaking each egg shell when said egg reaches said second position in such a manner as to permit the raw whole egg to drop down to a first station; advancing a sealable container to said first station before said first shell is broken and so continuing said container advance at timed intervals each time a shell is broken; sealing each container after raw egg is deposited therein; moving said sealed containers through a refrigerated space at such a rate that said eggs contained therein are solidly frozen; and packing said filled containers into receptacles for market distribution thereof.

2. A method as defined in claim 1 in which a first intermittently moving surface disposes said shell eggs in said first position in timed sequence.

3. A method as defined in claim 2 in which the end portions of said shell eggs are removably engaged by two facing concave surfaces in timed sequence after each egg is disposed in said first position, which surfaces lift said egg and transfer same to said second position.

4. A method as defined in claim 3 in which said shell is broken when said egg is disposed in said second position, which surfaces are laterally separated after said shell is broken.

5. A method as defined in claim 4 in which said laterally separated surfaces are moved to an intermediate location between said first and second positions where said broken shells are released and dropped therefrom before said surfaces engage another shell egg.

6. A method as defined in claim 5 in which said containers have an open top portion adapted to be sealed by a sheet cover when pressure is concurrently applied to said top portion and cover, which containers after receiving said raw egg are moved to said second station to be so sealed.

7. A method as defined in claim 6 in which a second intermittently moving surface is provided on which said containers are delivered at the same intermittent rate at which said containers receive said raw eggs.

8. A method as defined in claim 7 in which said open-topped containers may be sealed by a circular cover when deposited thereover after a raw egg has been deposited therein after said containers have been moved by said surface to a second station at which a supply of said covers is stacked.

9. A method as defined in claim 8 in which a vertical, rotatably movable concave, resilient surface to which a vacuum may be applied is provided at said second station, which concave surface intermittently moves into contact with the upper surface of the uppermost of said stacked covers as said containers are delivered to said second station creating a vacuum between said concave surface and cover surface after said contact is made, raising and rotating said concave surface and cover and positioning said cover over said container, lowering said concave surface and cover onto said container, and breaking said vacuum after disposition of said cover on said container.

10. A method as defined in claim 9 in which said filled container on which said cover is deposited is advanced to a third station by said second surface at which station the upper portion of said container and said cover are subjected to pressure to cause sealing engagement thereof as an integral unit.

11. A method as defined in claim 10 in which said sealed containers are transported to a fourth station by said second surface where said containers are displaced from said second surface onto a third moving surface traveling outwardly therefrom toward said refrigerated space.

12. A method as defined in claim 11 in which a predetermined number of said sealed containers are contactingly arranged in side-by-side spaced rows after advancement thereof by said third moving surface to a fifth station, which rows are then slidably removed from said third surface to a fourth moving surface extending through said refrigerated space.

13. A method as defined in claim 12 in which said containers are delivered to a sixth station after passage through said refrigerated space, at which station a predetermined number of said containers are packed into receptacles which packed receptacles are transferred to a fifth outwardly moving surface and transported to a refrigerated storage area.

14. A method as defined in claim 13 in which said broken shells after release of said raw egg therefrom are moved to a position over a sixth moving surface on which they are dropped and transported thereby to a localized area for disposal thereof.

References Cited in the file of this patent

UNITED STATES PATENTS

| | | |
|---|---|---|
| 154,553 | Kuh | Sept. 1, 1874 |
| 2,090,963 | Reese | Aug. 24, 1937 |
| 2,142,744 | Carew | Jan. 3, 1939 |
| 2,415,173 | Hulbert | Feb. 4, 1947 |
| 2,443,188 | Hodson | June 15, 1948 |
| 2,496,755 | Schwartzberg | Feb. 7, 1950 |
| 2,525,096 | Damuth | Oct. 10, 1950 |
| 2,621,704 | Langer | Dec. 16, 1952 |
| 2,627,893 | Williams | Feb. 10, 1953 |
| 2,660,530 | Adams | Nov. 24, 1953 |
| 2,760,537 | Willsey | Aug. 28, 1956 |